(12) United States Patent
Bagaoisan et al.

(10) Patent No.: US 6,704,170 B2
(45) Date of Patent: Mar. 9, 2004

(54) ACTUATOR MOLDING AND BAKING PROCESS PARAMETERS FOR POLYPHENYLENE SULFIDE 40% GLASS FILL FOR HIGH TEMPERATURE OVERMOLD CARRIAGE OPERATION IN HARD DISK DRIVES

(75) Inventors: David Joseph Bagaoisan, Milpitas, CA (US); Tim Lincoln, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 97 days.

(21) Appl. No.: 09/992,157

(22) Filed: Nov. 5, 2001

(65) Prior Publication Data

US 2003/0086211 A1 May 8, 2003

(51) Int. Cl.$^7$ ............... G11B 21/08; B29B 7/00; B29B 45/00
(52) U.S. Cl. ............... 360/265.7; 264/328.16; 264/478; 360/265.9
(58) Field of Search ............... 360/265.7, 265.9; 264/478, 239, 327, 328.1, 328.16

(56) References Cited

U.S. PATENT DOCUMENTS

| | | | | |
|---|---|---|---|---|
| 5,122,703 A | * | 6/1992 | Takahashi et al. | 310/36 |
| 5,165,090 A | * | 11/1992 | Takahashi et al. | 369/215 |
| 5,627,701 A | * | 5/1997 | Misso et al. | 360/265.8 |
| 5,691,581 A | * | 11/1997 | Umehara et al. | 310/13 |
| 5,726,835 A | * | 3/1998 | Scanlon et al. | 360/265 |
| 5,894,382 A | * | 4/1999 | Hyde | 360/265.6 |
| 6,061,206 A | * | 5/2000 | Foisy et al. | 360/265.7 |

FOREIGN PATENT DOCUMENTS

| | | | | |
|---|---|---|---|---|
| JP | 62151461 A | * | 7/1987 | C08L/81/02 |
| JP | 05198140 A | * | 8/1993 | G11B/25/04 |
| JP | 07143721 A | * | 6/1995 | H02K/33/18 |
| JP | 09063210 A | * | 3/1997 | G11B/21/02 |

OTHER PUBLICATIONS

"Actuator Coil Structural Damping," Feb. 1, 1985, IBM TDB, vol. No. 27, Iss. No. 9, pp. 5230–5232.*

* cited by examiner

Primary Examiner—William Klimowicz
(74) Attorney, Agent, or Firm—Robert B. Martin; Bracewell & Patterson, L.L.P.

(57) ABSTRACT

A method is provided for forming a body for a hard disk carriage assembly from polyphenylene sulfide 40% glass fill. An injection mold is heated to approximately 130° C.; then a volume of polyphenylene sulfide 40% glass fill is injected into the mold to form the body of the carriage assembly. The polyphenylene sulfide 40% glass fill is then cooled within the mold for approximately 45 seconds before the body is ejected from the mold cavity. The body is then heated to approximately 130° C. for at least 2 hours in a post-bake operation.

1 Claim, 6 Drawing Sheets

ACTUATOR MOLDING AND BAKING PROCESS PARAMETERS FOR POLYPHENYLENE SULFIDE 40% GLASS FILL FOR HIGH TEMPERATURE OVERMOLD CARRIAGE OPERATION IN HARD DISK DRIVES

BACKGROUND OF THE INVENTION

1. Technical Field

The present invention relates to a method of molding and baking polyphenylene sulfide (PPS) for overmold carriages for use in computer hard disk drives to minimize heat-induced deflections and improve structural stiffness characteristics.

2. Description of the Related Art

Carriage assemblies in computer hard drives carry read/write transducer heads across the surface of the disks to the desired information track. The read/write heads are positioned in very close proximity to the surface of the disks, riding upon an air bearing created by the rapid rotation of the disk. Through accompanying electronic circuitry, the read/write heads are used to read digital information from the disks and to write digital information to the disks. It is known in the art to form these carriage assemblies from lightweight, strong materials and from combinations of the materials. These materials are primarily metals, such as aluminum, and plastics, such as polyphenylene sulfide (PPS) with 40% glass fill.

PPS is a thermoplastic polycondensate that has been mass-produced since 1973 and is sold by Chevron Phillips Chemical Company under the trademark RYTON. PPS is used to make high performance electrical connectors and other high stress parts because of its high temperature resistance (230° C. continuous) and low temperature endurance.

FIG. 1 shows a typical overmold carriage assembly 11, assembly 11 having two arms 13 extending from a molded plastic body 15. Arms 13 are preferably formed from stamped aluminum and have forward ends 17 that are adapted to carry read/write heads (not shown). Body 15 is formed by molding PPS 40% glass fill on a carriage in an injection mold, body 15 having a central portion 19 and a rear portion 21. An opening 23 in central portion 19 acts a pivot center for assembly 11. Rear portion 21 houses a voice coil 25 and may house other components of the carriage assembly.

Typically, overmold carriage manufacturers inject molten PPS 40% glass fill into a mold preheated to approximately 80° C. Because the glass transition temperature of PPS 40% glass fill is between approximately 80° C. and approximately 125° C., less warpage and plastic deformation occurs if the mold is heated above 130 deg C. or below 80 deg C. To allow for the use of lower mold temperatures, carriage manufacturers will typically post-bake the finished carriage at a higher temp, for example, approximately 130° C., to improve the characteristics of the finished part. An alternate prior-art method of forming overmold carriages uses a mold temperature of approximately 130° C., then the carriage is post-baked at approximately 80° C.

Overmold carriages molded using this method have been shown to undergo a severe deflection in the range of approximately 0.03 mm to 0.04 mm as they are exposed to the higher temperatures for as little as 1 to 2 hrs, limiting the use of PPS 40% glass fill to designs with loose tolerances and thus non-high performance designs. FIG. 2 is a graph of the deflection vs. number of thermal cycles in samples of PPS 40% glass fill molded using the alternate 130° C. molding process with a post bake at 80° C. FIG. 2 shows that the average deflection increases with each successive thermal cycle, and these results are comparable to those achieved when using the method using a 80° C. mold and a 130° C. post-bake.

An additional problem with the typical prior-art method is that the material produced has a wide range of structural stiffness. The structural stiffness determines the frequency response of the material, and resonance modes can shift by as much as 200 Hz, causing problems with servo design and performance. FIG. 3 is a frequency response plot for a carriage assembly produced using the typical prior-art method. Butterfly modes, referring to the in-plane bending of the rear portion of the body that houses the coil, occur at approximately 5.25 kHz, approximately 12.0 kHz, and approximately 17.0 kHz. FIG. 3 also shows the variation in frequency responses of different samples, especially at higher frequencies.

Therefore, there is a need for an improved method of forming carriage assemblies from PPS 40% glass fill in which the resulting parts have improved resistance to deflection during heating and improved structural stiffness characteristics.

SUMMARY OF THE INVENTION

A method is provided for forming a body for a hard disk carriage assembly from polyphenylene sulfide 40% glass fill. An injection mold is heated to approximately 130° C.; then a volume of polyphenylene sulfide 40% glass fill is injected into the mold to form the body of the carriage assembly. The polyphenylene sulfide 40% glass fill is then cooled within the mold for approximately 45 seconds before the body is ejected from the mold cavity. The body is then heated to approximately 130° C. for at least 2 hours in a post-bake operation.

DETAILED DESCRIPTION OF THE PREFERRED EMBODIMENT

The present invention is an improved process to mold PPS 40% glass fill resin onto a carriage, forming a body of a carriage assembly. Though the present method is described for use in forming overmold carriages for hard disk drives, the method may also be used in forming other types of electrical and electro-mechanical components.

The PPS which is utilized in the method of the invention can be obtained commercially, for example, from the Chevron Phillips Chemical Company as the RYTON family of polyphenylene sulfide resins.

In the first step in the method of the invention, a mold is preheated to approximately 130° C. before injection of the PPS 40% glass fill. The mold can be a standard, commercially-supplied injection mold capable of handling the process temperatures envisioned in the practice of the present method. The approximately 130° C. temperature exceeds that used in the prior-art manufacturing technique practiced in the computer industry. A volume of molten PPS 40% glass fill is then injected into the mold to form the body of an overmold carriage. After injection, the mold is allowed to cool for 45 seconds before the body is ejected from the mold. The body is ejected from the mold, then baked in an oven at approximately 130° C. for at least 2 hours. Experimentation has shown that it is this combination of both mold and post-bake temperatures that have the greatest success in improving the material's dynamic and dimensional stability and that the mold temperature, cooling cycle and post-bake cycle are all critical in achieving optimum properties in the final part.

Figure 4:
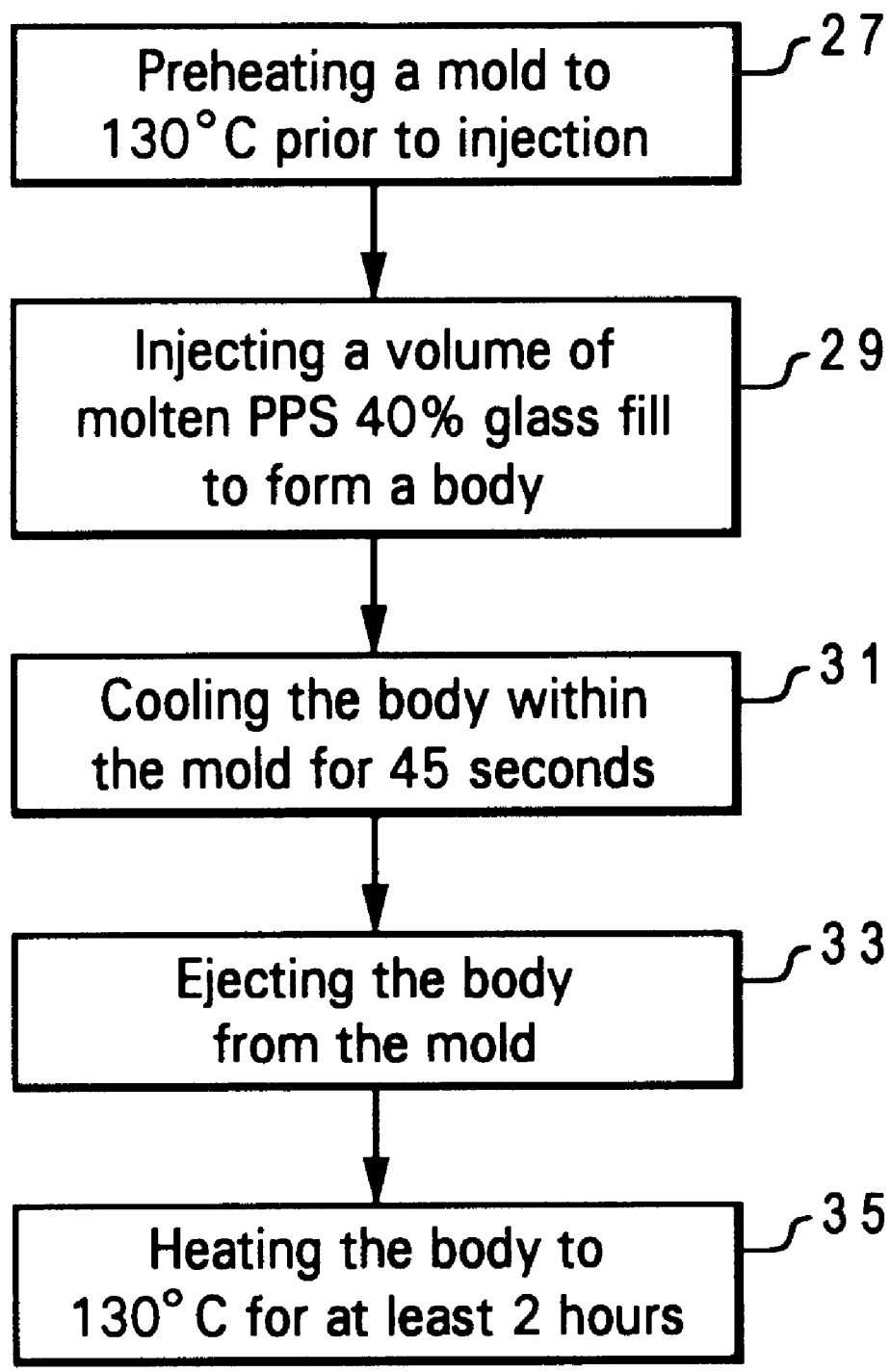
FIG. 4 is a flowchart of the method of the present invention.

FIG. 4 is a flowchart illustrating the method of the present invention. Block 27 represents the first step of preheating the mold to approximately 130° C. before injection of the resin. The next step of injecting the PPS 40% glass fill is indicated by block 29. Block 31 is the cooling step, in which the body is cooled for 45 seconds before it is ejected in the next step of the method, represented by block 33. The final step, in block 35, is to post-bake the body in an oven for at least 2 hours at approximately 130° C.

Figure 1:
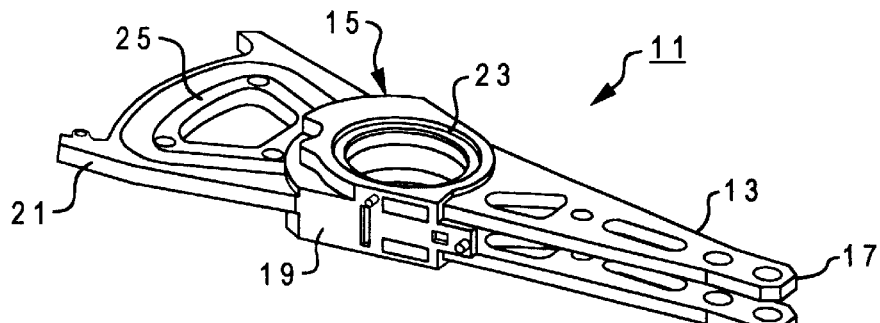
FIG. 1 is a perspective view of a carriage assembly for a hard disk drive formed using a prior art method.
Figure 2:
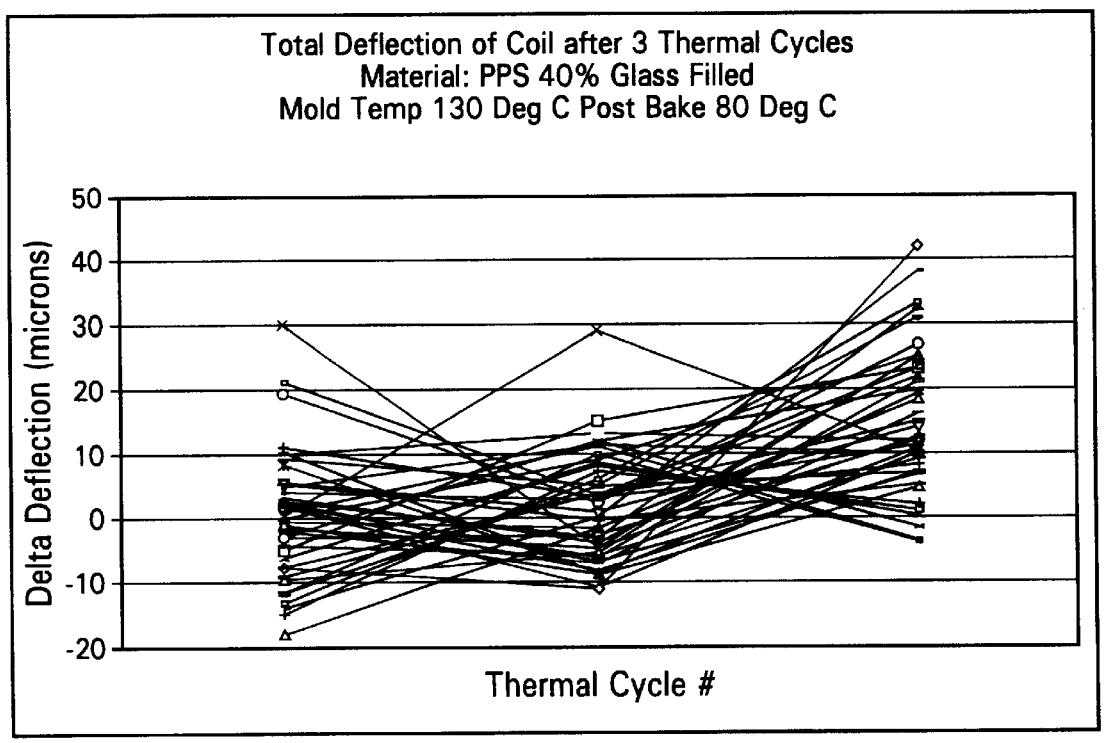
FIG. 2 is a graph of deflection versus number of thermal cycles of samples of the carriage assembly of FIG. 1.
Figure 3:
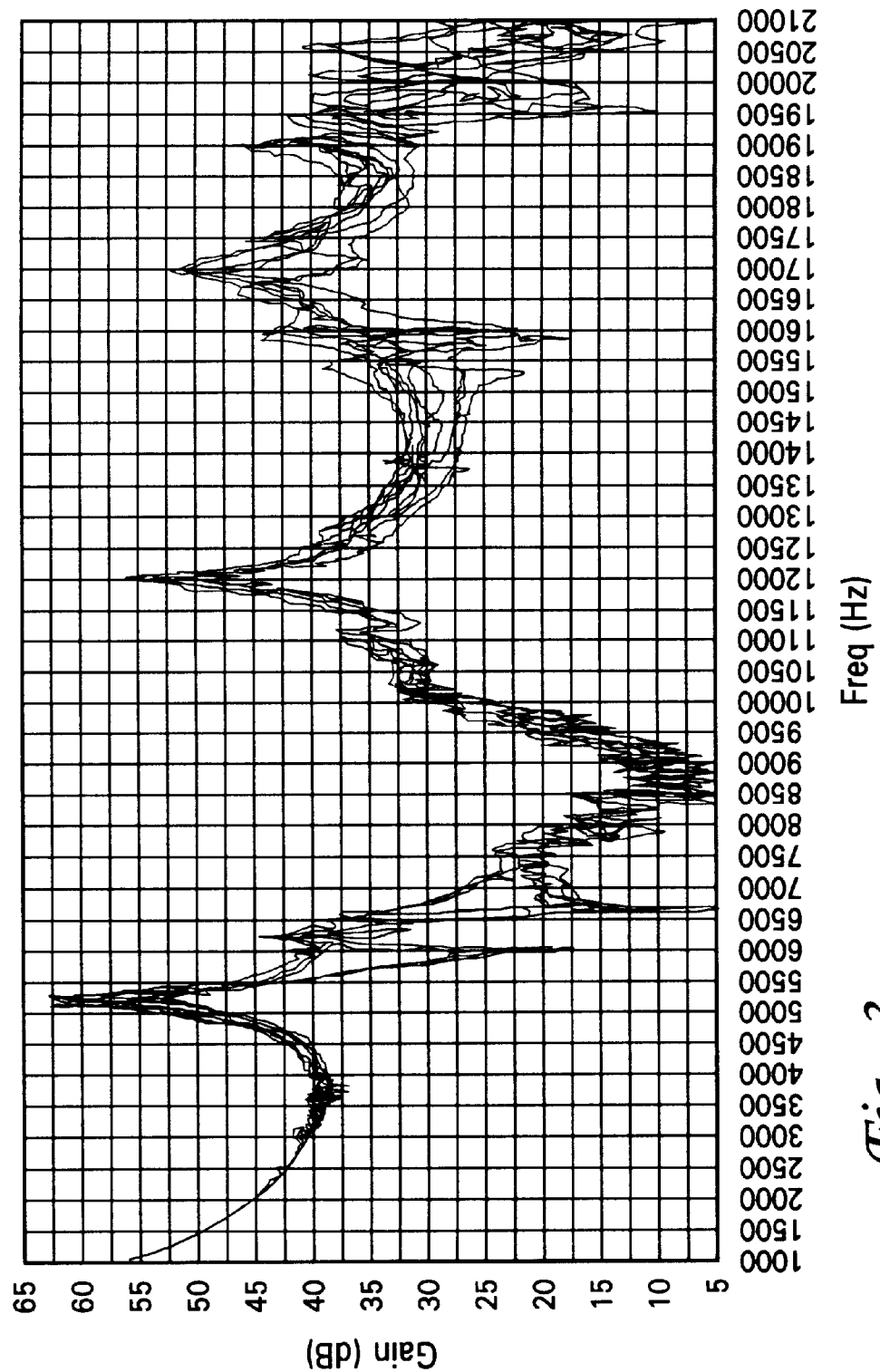
FIG. 3 is a frequency response plot of samples of the carriage assembly of FIG. 1.

Once the overmold carriage is formed, the carriage can be assembled by attaching arms to the carriage body, producing an assembly like that shown in FIG. 1.

Figure 5:
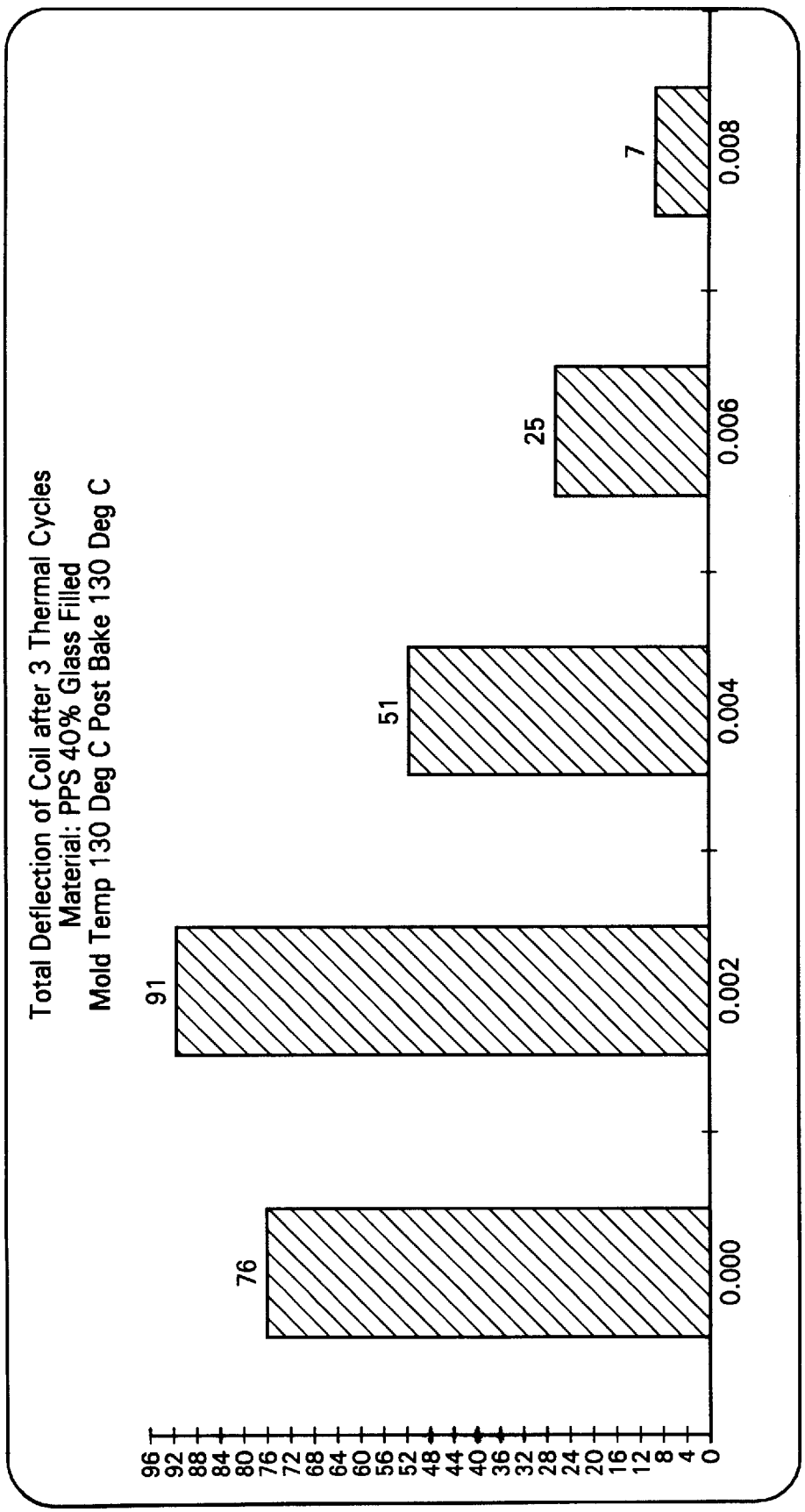
FIG. 5 is a chart of number of samples versus deflection for samples of a carriage assembly formed using the method of the present invention.

The method of the present invention produces carriage assemblies that have greatly improved resistance to heat-induced deflections. FIG. 5 illustrates the reduction of deflection occurring in overmold carriages formed using the method of the present invention. The chart of FIG. 5 shows the number of samples that deflected a given amount after three thermal cycles. For example, 76 samples exhibited no deflection, whereas the maximum deflection of 0.008 mm occurred in 7 samples. This compares very favorably with the deflection amounts of approximately 0.03 mm to 0.04 mm, described above, that occur in overmold carriages produced by the prior-art method.

Figure 6:
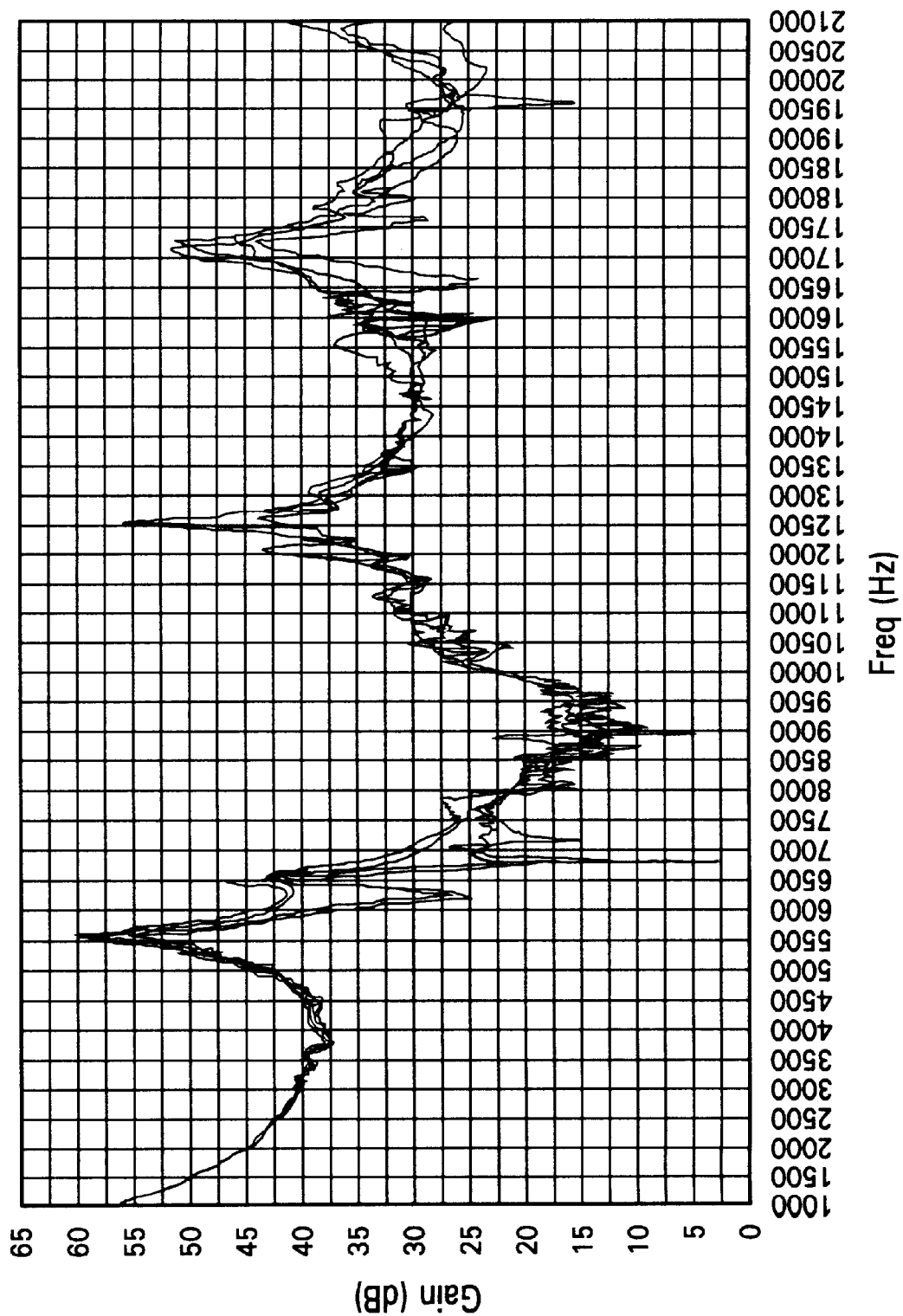
FIG. 6 is a is a frequency response plot for samples of a carriage assembly formed using the method of the present invention.
Figure 7:
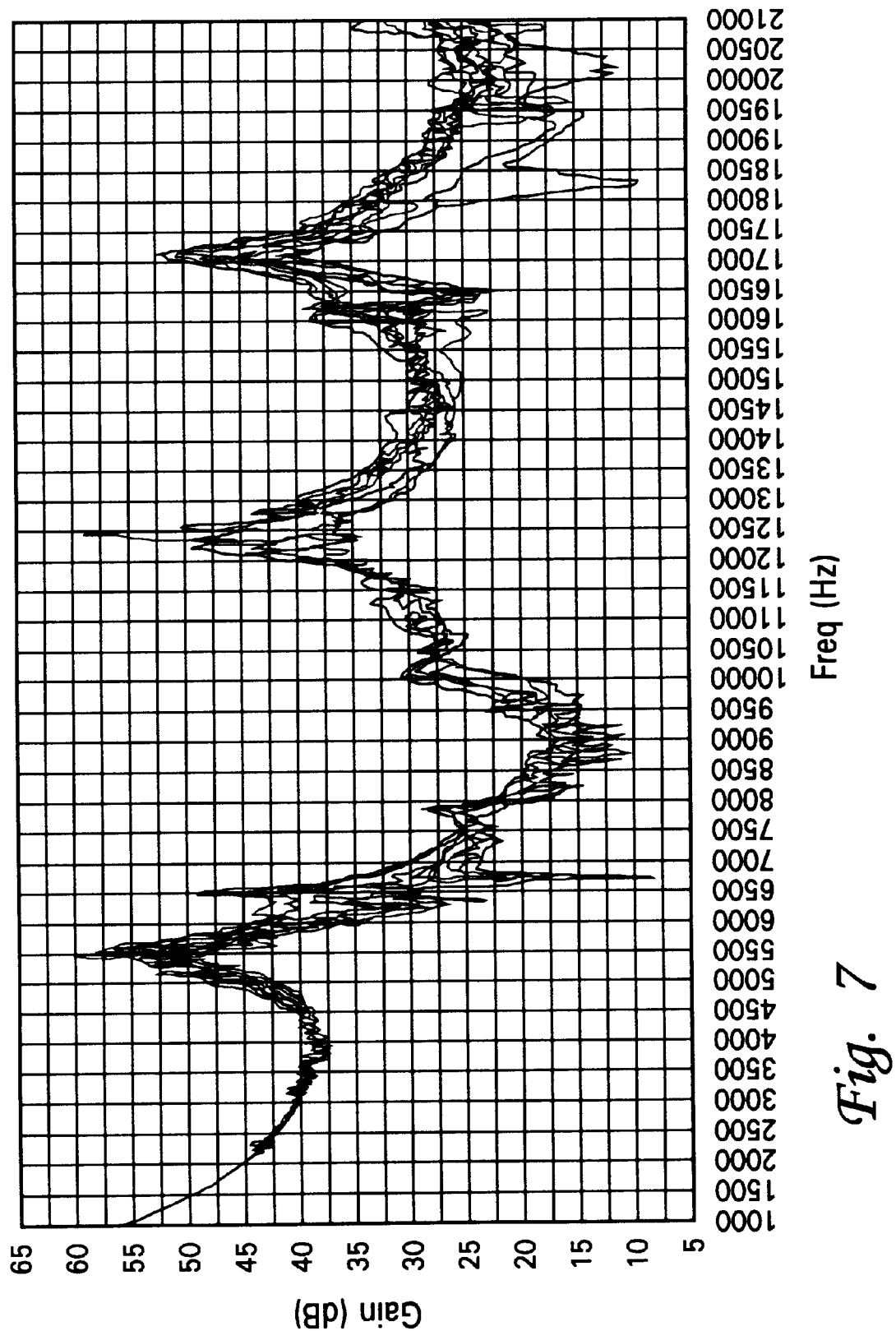
FIG. 7 is a second frequency response plot for samples of a carriage assembly formed using the method of the present invention.

FIGS. 6 and 7 illustrate the improvement seen in dynamic modes. Each figure is a frequency response plots for samples of carriage overmolds produced with the method of the present invention by a particular manufacturer. The plots show that there is less variation between samples from a given manufacturer in the responses along the range of frequencies, but this is especially noticeable in higher frequencies. FIGS. 6 and 7 also indicate that there is a desired consistency between samples from different manufacturers. An additional benefit is that the butterfly modes occur at higher frequencies than in prior-art carriage assemblies, occurring at 5.5 kHz, 12.6 kHz, and 17.25 kHz in samples from both manufacturers. These changes in frequency response indicate a higher structural stiffness and a repeatable formation of the structures of the overmold carriages.

While the invention has been particularly shown and described with reference to a preferred embodiment, it will be understood by those skilled in the art that various changes in form and detail may be made therein without departing from the spirit and scope of the invention.

What is claimed is:

1. A carriage assembly, comprising:
   a body formed from polyphenylene sulfide 40% glass fill; and
   arms extending from the body, the arms receiving heads for use in disk drive operations; and
   wherein
   the body is formed by injecting molten polyphenylene sulfide 40% glass fill in a mold preheated to approximately 130° C., followed by cooling the mold for approximately 45 seconds before ejecting the body from the mold, the body then being heated to approximately 130° C. for at least 2 hours, wherein the heat-induced deflection of the body is less than 0.010 mm.

* * * * *